(12) United States Patent
Lin et al.

(10) Patent No.: US 12,451,819 B2
(45) Date of Patent: Oct. 21, 2025

(54) WEAR RESISTANT TRIBOELECTRIC NANOGENERATING DEVICE, WEAR RESISTANT SCALY TRIBOELECTRIC MEMBRANE FABRICATING METHOD AND BICYCLE

(71) Applicant: National Tsing Hua University, Hsinchu (TW)

(72) Inventors: Zong-Hong Lin, Hsinchu (TW); Ming-Zheng Huang, Hsinchu (TW); Hsuan-Yu Yeh, Hsinchu (TW); An-Rong Chen, Hsinchu (TW); Yao-Hsuan Tseng, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 353 days.

(21) Appl. No.: 18/164,839

(22) Filed: Feb. 6, 2023

(65) Prior Publication Data
US 2024/0120854 A1   Apr. 11, 2024

(30) Foreign Application Priority Data
Oct. 6, 2022  (TW) ................................. 111138052

(51) Int. Cl.
*H02N 1/04*    (2006.01)
*B62J 1/28*    (2006.01)
*B62J 45/00*   (2020.01)

(52) U.S. Cl.
CPC ................. *H02N 1/04* (2013.01); *B62J 1/28* (2013.01); *B62J 45/00* (2020.02)

(58) Field of Classification Search
CPC ................ H02N 1/04; B62J 1/28; B62J 45/00
See application file for complete search history.

(56) References Cited

U.S. PATENT DOCUMENTS 9,790,928 B2 * 10/2017 Wang ........................ F03G 5/06

FOREIGN PATENT DOCUMENTS

| KR | 2017007083 A | * | 1/2017 | ................ B62J 6/08 |
| KR | 2022099078 A | * | 7/2022 | |

OTHER PUBLICATIONS

KR-2022099078-A_translate (Year: 2022).*
KR-2017007083-A_translate (Year: 2017).*

* cited by examiner

*Primary Examiner* — Tulsidas C Patel
*Assistant Examiner* — Mohammed Ahmed Qureshi
(74) *Attorney, Agent, or Firm* — The Webb Law Firm

(57) ABSTRACT

A triboelectric nanogenerating device is configured for providing an electric power to an electronic device and the triboelectric nanogenerating device includes at least one scaly triboelectric membrane configured for providing the electric power to the electronic device by frictional electrification. The at least one scaly triboelectric membrane includes a keratin and a polyvinyl alcohol, the at least one scaly triboelectric membrane has a first triboelectric surface, and the first triboelectric surface of the at least one scaly triboelectric membrane includes a plurality of scaly layers. Each of the scaly layers is arranged in order and extends along an orienting direction. A distal end of each of the scaly layers has a plurality of saw-tooth structures.

15 Claims, 21 Drawing Sheets
(1 of 21 Drawing Sheet(s) Filed in Color)

WEAR RESISTANT TRIBOELECTRIC NANOGENERATING DEVICE, WEAR RESISTANT SCALY TRIBOELECTRIC MEMBRANE FABRICATING METHOD AND BICYCLE

RELATED APPLICATIONS

This application claims priority to Taiwanese Patent Application No. 111138052, filed Oct. 6, 2022, the disclosure of which is hereby incorporated by reference in its entirety.

BACKGROUND OF THE INVENTION

Field of the Invention

The present disclosure relates to a wear resistant triboelectric nanogenerating device, a wear resistant scaly triboelectric membrane fabricating method and a bicycle. More particularly, the present disclosure relates to a triboelectric nanogenerating device, a scaly triboelectric membrane fabricating method and a bicycle by frictional electrification.

Description of Related Art

As time progresses, peoples' awareness of the environmental protection arises gradually, and the trend of the use of the energy is to develop the green energy. Thus, bicycles become a popular choice of the transportation. In population centers, particularly, the traffic environment is more complicated. However, warning devices of the bicycle are far away from the completeness compared with cars or scooters. Besides, in the age of internet of things (IoT), the needs of various kinds of sensors increase rapidly, people expect to monitor datasets sensed in real time which are connected to IoT to be analyzed, so light-weighted sensing devices being served as a part of IoT technology faces the challenges of the electric power and the battery size. A triboelectric nanogenerator (TENG) working based on the principle of frictional electrification and electrostatic induction is widely applied to many fields because the TENG can convert the mechanical energy to the electric energy and have advantages such as low costs, simple structures, and multiple-material selectivity. However, a triboelectric membrane used in the TENG for a long-term frictional electrification may lead to wearing out a surface of the triboelectric membrane so the output voltage is decreased and the stability of providing the electric power is also decreased.

Accordingly, a triboelectric nanogenerating device which is wear resistant and can provide the electric power stably is still a goal that those in the industry pursue.

SUMMARY OF THE INVENTION

According to one aspect of the present disclosure, a triboelectric nanogenerating device is configured for providing an electric power to an electronic device and the triboelectric nanogenerating device includes at least one scaly triboelectric membrane configured for providing the electric power to the electronic device by frictional electrification. The at least one scaly triboelectric membrane includes a keratin and a polyvinyl alcohol, the at least one scaly triboelectric membrane has a first triboelectric surface, and the first triboelectric surface of the at least one scaly triboelectric membrane includes a plurality of scaly layers. Each of the scaly layers is arranged in order and extends along an orienting direction. A distal end of each of the scaly layers has a plurality of saw-tooth structures.

According to one aspect of the present disclosure, a scaly triboelectric membrane fabricating method is configured for fabricating a scaly triboelectric membrane of a triboelectric nanogenerating device and the scaly triboelectric membrane fabricating method includes a first molding step, a material mixing step and a second molding step. The first molding step is performed to pour a molding liquid into a first surface of a first template, to heat and cure the molding liquid to form a second template, and then to remove the second template from the first template. A material of the molding liquid is polydimethylsiloxane, and a material of the first template is a snake scale. The material mixing step is performed to mix a keratin with a polyvinyl alcohol to form a liquid. The second molding step is performed to pour the liquid into a second surface of the second template corresponding to the first surface of the first template, and then to remove the scaly triboelectric membrane formed by curing the liquid from the second template. The scaly triboelectric membrane has a first triboelectric surface, the first triboelectric surface comprises a plurality of scaly layers, each of the scaly layers is arranged in order and extends along an orienting direction, and a distal end of each of the scaly layers has a plurality of saw-tooth structures.

According to one aspect of the present disclosure, a bicycle includes a bicycle frame, two wheels, at least one electronic device and at least one triboelectric nanogenerating device. The bicycle frame includes a seat saddle, two wheels are connected to the bicycle frame, the at least one electronic device is disposed at the bicycle frame, the at least one triboelectric nanogenerating device is configured for providing an electric power to the at least one electronic device, and the at least one triboelectric nanogenerating device includes at least one scaly triboelectric membrane. The at least one scaly triboelectric membrane is configured for providing the electric power to the at least one electronic device by frictional electrification. The at least one scaly triboelectric membrane includes a keratin and a polyvinyl alcohol, the at least one scaly triboelectric membrane has a first triboelectric surface, and the first triboelectric surface of the at least one scaly triboelectric membrane includes a plurality of scaly layers. Each of the scaly layers arranged in order and extending along an orienting direction, wherein a distal end of each of the scaly layers has a plurality of saw-tooth structures.

BRIEF DESCRIPTION OF THE DRAWINGS

The patent or application file contains at least one drawing executed in color. Copies of this patent or patent application publication with color drawing(s) will be provided by Office upon request and payment of the necessary fee. The present disclosure can be more fully understood by reading the following detailed description of the embodiment, with reference made to the accompanying drawings as follows.

DESCRIPTION OF THE INVENTION

Figure 1:
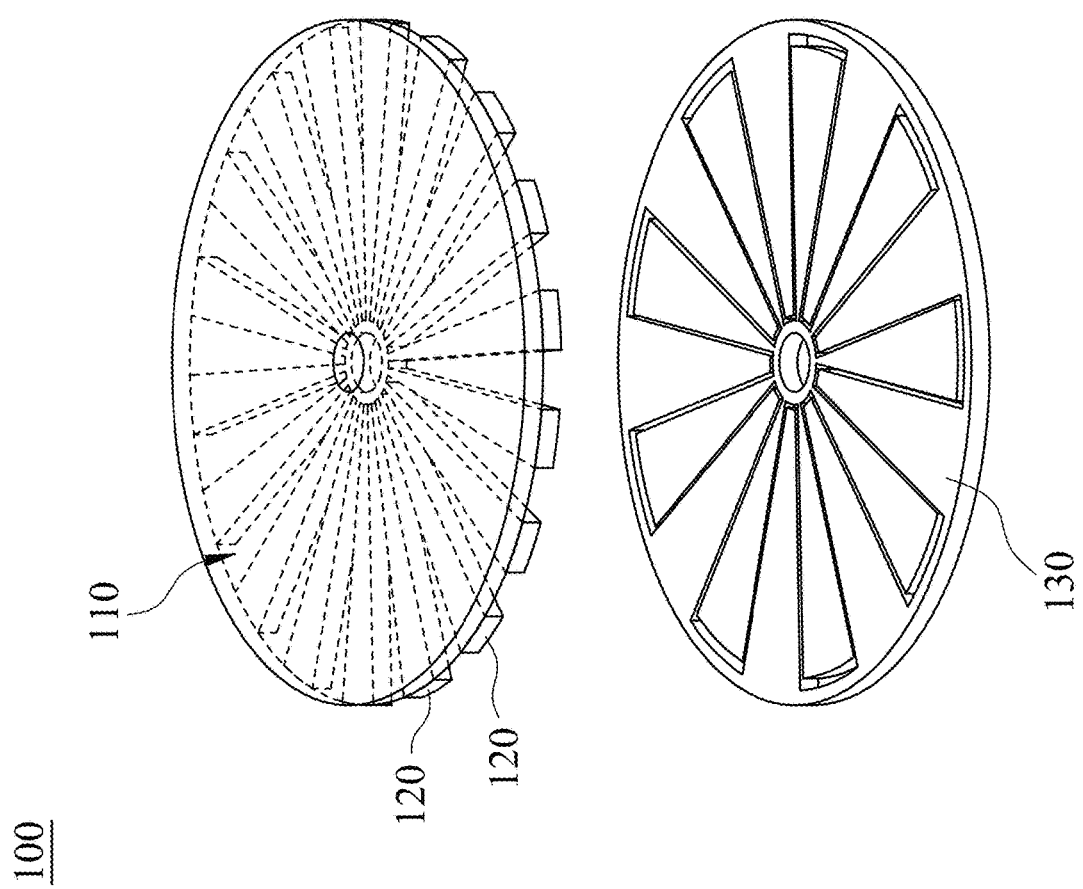
FIG. 1 shows an exploded view of a triboelectric nanogenerating device according to the 1st embodiment of the present disclosure.
Figure 2:
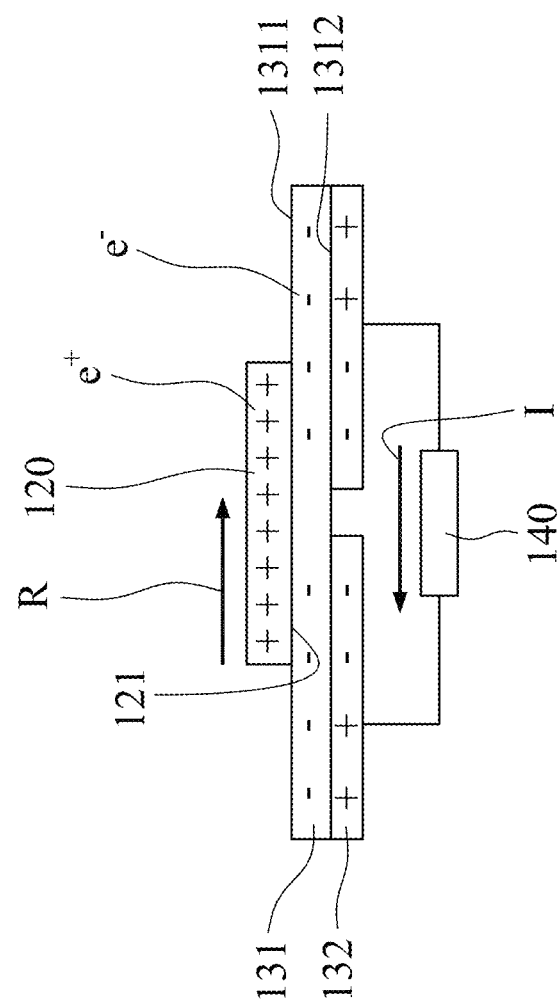
FIG. 2 shows an electrical schematic view of the triboelectric nanogenerating device according to the 1st embodiment in FIG. 1.
Figure 3:
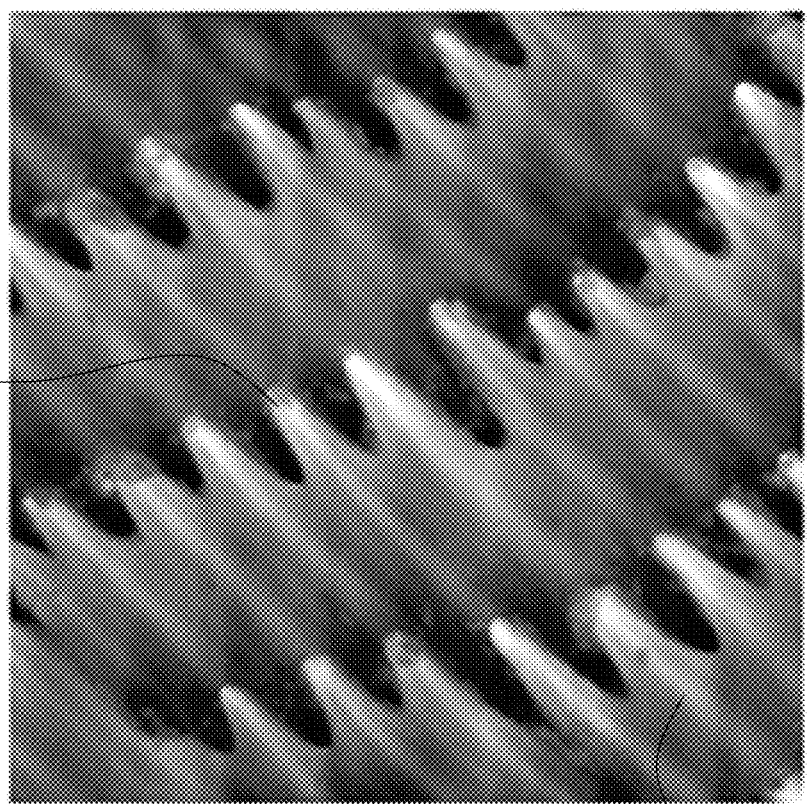
FIG. 3 shows a schematic view of the structure of the first triboelectric surface according to the 1st embodiment in FIG. 2 on a scanning electron microscope.

FIG. 1 shows an exploded view of a triboelectric nanogenerating device 100 according to the 1st embodiment of the present disclosure. FIG. 2 shows an electrical schematic view of the triboelectric nanogenerating device 100 according to the 1st embodiment in FIG. 1. FIG. 3 shows a schematic view of the structure of the first triboelectric surface 121 according to the 1st embodiment in FIG. 2 on a scanning electron microscope. As shown in FIGS. 1 to 3, the triboelectric nanogenerating device 100 is configured for providing an electric power to an electronic device 140, and the triboelectric nanogenerating device 100 includes at least one scaly triboelectric membrane 120. The scaly triboelectric membrane 120 is configured for providing the electric power to the electronic device 140 by frictional electrification, the scaly triboelectric membrane 120 includes a keratin and a polyvinyl alcohol (PVA), the scaly triboelectric membrane 120 has a first triboelectric surface 121, and the first triboelectric surface 121 of the scaly triboelectric membrane 120 includes a plurality of scaly layers 1211. Each of the scaly layers 1211 is arranged in order and extends along an orienting direction, and a distal end of each of the scaly layers 1211 has a plurality of saw-tooth structures 1212. Therefore, by the structure of the scaly layers 1211 formed on the first triboelectric surface 121 which mimics the structure of a snake scale, a wear resistance of the first triboelectric surface 121 can be increased effectively, a wear loss of the scaly triboelectric membrane 120 during long-term frictional electrification is decreased, and then a declining trend of an output potential of the scaly triboelectric membrane 120 during frictional electrification is reduced such that the electric power can be provided to the electronic device 140 stably and the service life of the triboelectric nanogenerating device 100 can be increased under the condition that the triboelectric nanogenerating device 100 generates the electric power for a long term. The detail of the triboelectric nanogenerating device 100 of the 1st embodiment is described in the following.

Specifically, the structure of the scaly triboelectric membrane 120 can be applied to different kinds of triboelectric nanogenerating devices. In detail, structures of the triboelectric nanogenerating devices according to different applications for frictional electrification are classified as a vertical contact-separation (CS) mode, a lateral-sliding (LS) mode, a single-electrode (SE) mode and a freestanding triboelectric-layer (FT) mode, but the present disclosure is not limited thereto. In the 1st embodiment, the triboelectric nanogenerating device 100 is a rotary-sliding triboelectric nanogenerator (RS-TENG) according to the LS mode. Furthermore, the triboelectric nanogenerating device 100 can further include a rotor element 110 and a stator element 130. The stator element 130 is electrically connected to the electronic device 140, and the stator element 130 includes an electrode triboelectric membrane 131 and a sensing electrode layer 132. The scaly triboelectric membrane 120 is disposed on the rotor element 110. The electrode triboelectric membrane 131 faces towards the first triboelectric surface 121 of the scaly triboelectric membrane 120, and the electrode triboelectric membrane 131 has a second triboelectric surface 1311 and a downward surface 1312. The second triboelectric surface 1311 of the electrode triboelectric membrane 131 is configured for rubbing against the first triboelectric surface 121 of the scaly triboelectric membrane 120. The sensing electrode layer 132 is disposed at the downward surface 1312. The sensing electrode layer 132 transmits the electric power to the electronic device 140 when the scaly triboelectric membrane 120 and the electrode triboelectric membrane 131 rub against and charge triboelectrically with each other.

A number of each of the scaly triboelectric membrane 120 and the electrode triboelectric membrane 131 is plural, each of the scaly triboelectric membranes 120 is arranged and spaced away from each other radially around a center of the rotor element 110, and each of the electrode triboelectric membranes 131 is arranged and spaced away from each other radially around a center of the stator element 130. As shown in FIG. 2, when the rotor element 110 rotates relatively to the stator element 130, the rotor element 110 drives the scaly triboelectric membranes 120 to rotate in a rotating direction R such that the first triboelectric surface 121 of each of the scaly triboelectric membranes 120 rubs against the second triboelectric surface 1311 of each of the electrode triboelectric membranes 131 to generate charge transferring and to drive a current I to flow into the electronic device 140 for providing the electric power to the electronic device 140 via the sensing electrode layer 132.

The scaly triboelectric membrane 120 can be made of the keratin and the polyvinyl alcohol. A weight percentage of the keratin can be ranged from 20% to 50%, a weight percentage of the polyvinyl alcohol can be ranged from 50% to 80%, and the keratin is mixed with the polyvinyl alcohol to form the scaly triboelectric membrane 120. In the 1st embodiment, the weight percentage of the keratin is 40%, and the weight percentage of the polyvinyl alcohol is 60%. Therefore, the texture of the snake scale can be mimicked. Moreover, the keratin can include a beta-sheet crystal structure. Therefore, the wear capability of the scaly triboelectric membrane 120 can be further improved.

Furthermore, a linear density of the scaly layers 1211 along the orienting direction can be ranged from 0.25 $\mu m^{-1}$ to 0.35 $\mu m^{-1}$. A linear density of the saw-tooth structures 1212 of each of the scaly layers 1211 along a tangential direction (perpendicular to the orienting direction) can be ranged from 0.95 $\mu m^{-1}$ to 1.05 $\mu m^{-1}$. The fidelity of the scaly layers 1211 mimicking the snake scale can be further improved.

Moreover, a material of the electrode triboelectric membranes 131 can be polytetrafluoroethylene. After the scaly triboelectric membrane 120 made of the keratin and the polyvinyl alcohol and the electrode triboelectric membranes 131 formed by polytetrafluoroethylene contact and charge with each other, the first triboelectric surface 121 of each of the scaly triboelectric membrane 120 is charged positively with positive charges $e^+$, and the second triboelectric surface 1311 of each of the electrode triboelectric membranes 131 is charged negatively with negative charges $e^-$. In the 1st embodiment, a surface potential of each of the scaly triboelectric membrane 120 after frictional electrification is 598 mV.

Figure 4A:
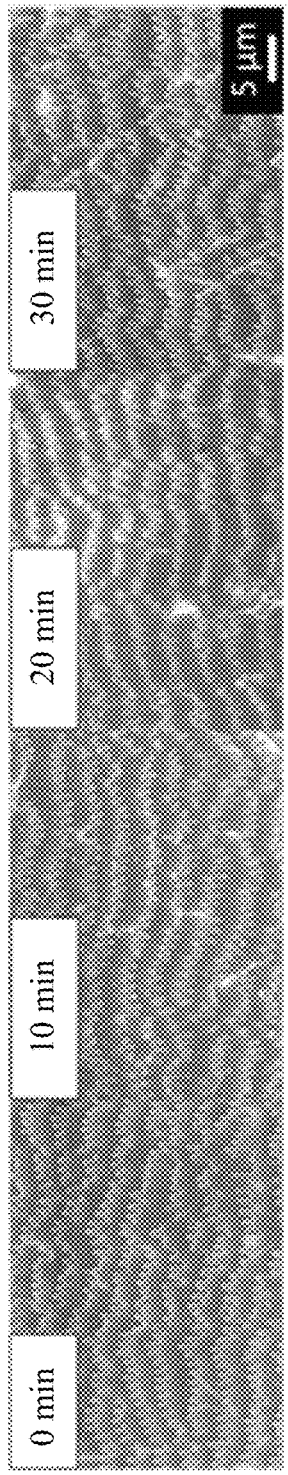
FIG. 4A shows a schematic view of the scaly triboelectric membrane according to the 1st embodiment in FIG. 1 after wearing on a scanning electron microscope.
Figure 4B:
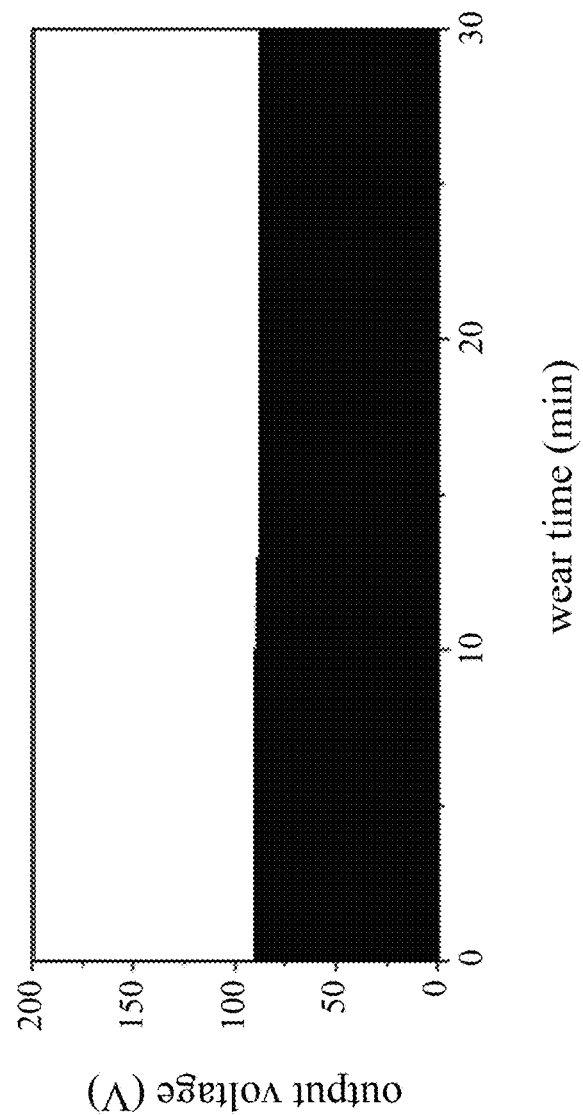
FIG. 4B shows a schematic view of the relation between an output voltage and a wear time of the scaly triboelectric membrane according to the 1st embodiment in FIG. 1 during frictional electrification.
Figure 5A:
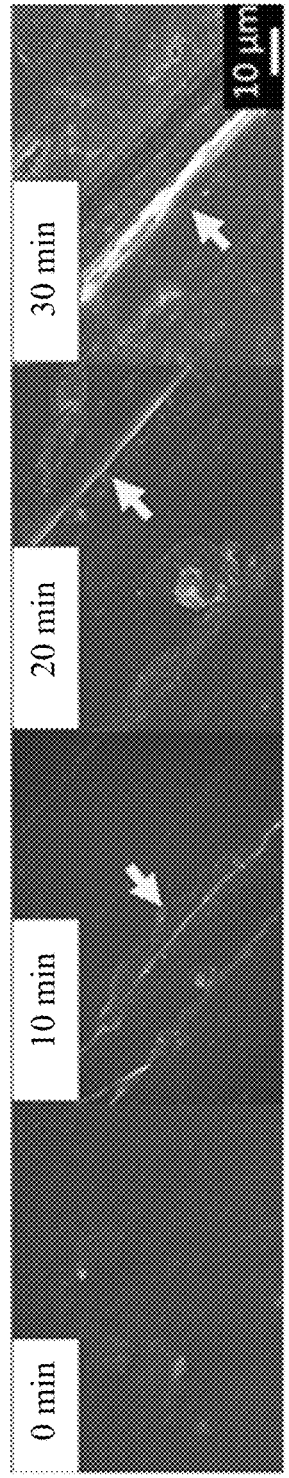
FIG. 5A shows a schematic view of a polylactic acid membrane according to the 1st comparison example after wearing on the scanning electron microscope.
Figure 5B:
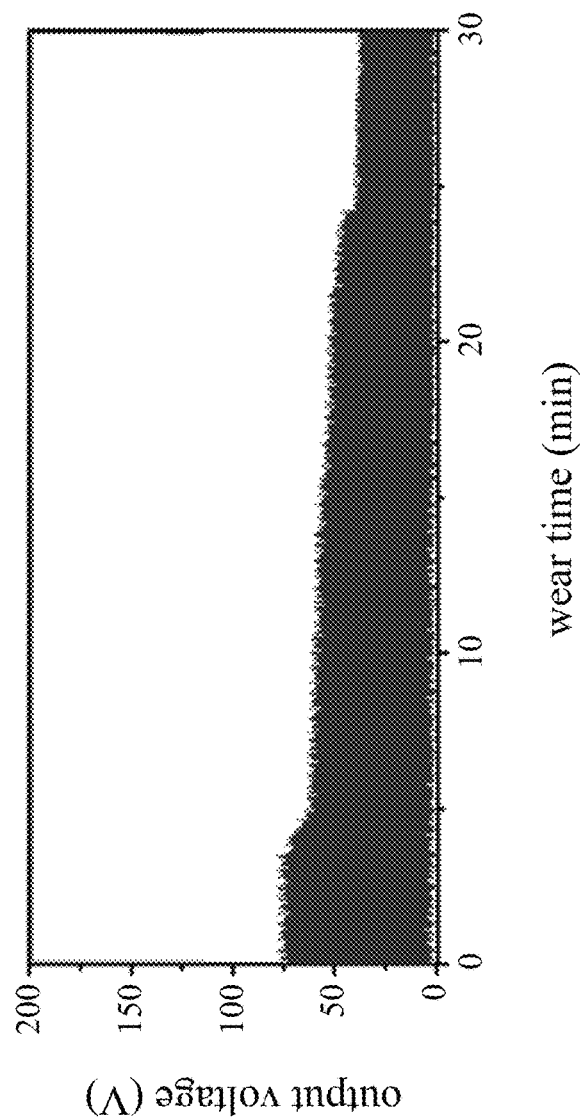
FIG. 5B shows a schematic view of the relation between an output voltage and a wear time of the polylactic acid membrane according to the 1st comparison example during frictional electrification.
Figure 6A:
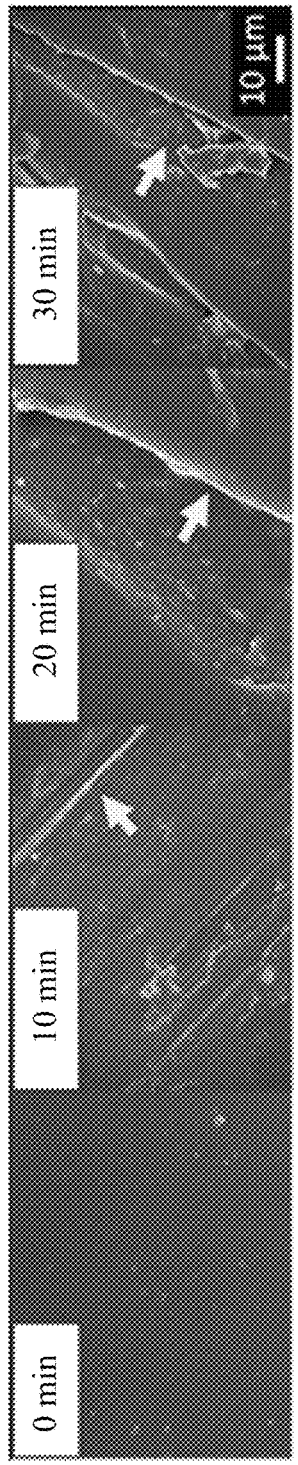
FIG. 6A shows a schematic view of a nylon membrane according to the 2nd comparison example after wearing on the scanning electron microscope.
Figure 6B:
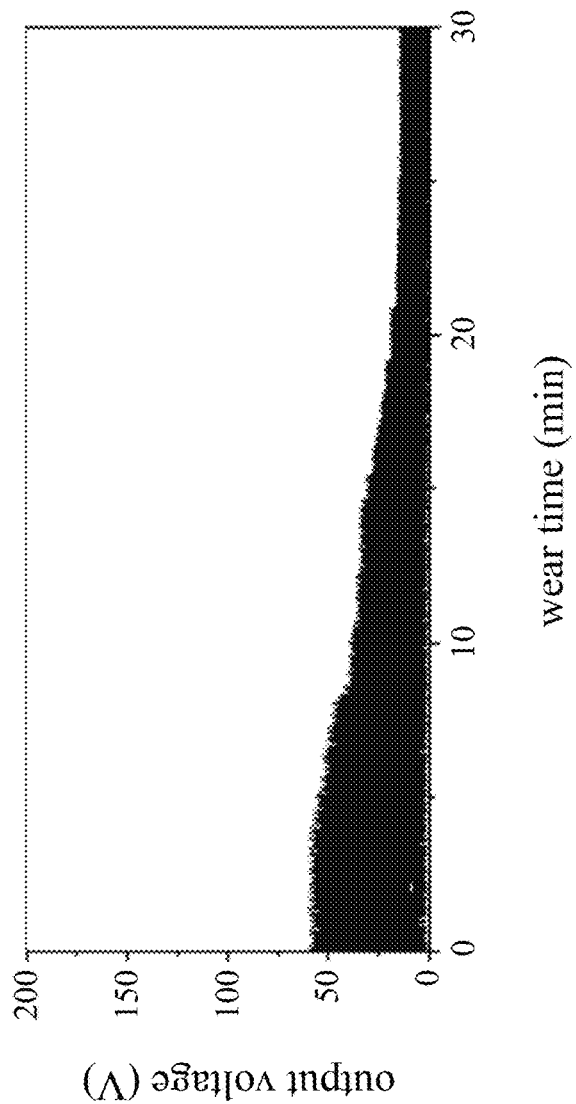
FIG. 6B shows a schematic view of the relation between an output voltage and a wear time of the nylon membrane according to the 2nd comparison example during frictional electrification.
Figure 7B:
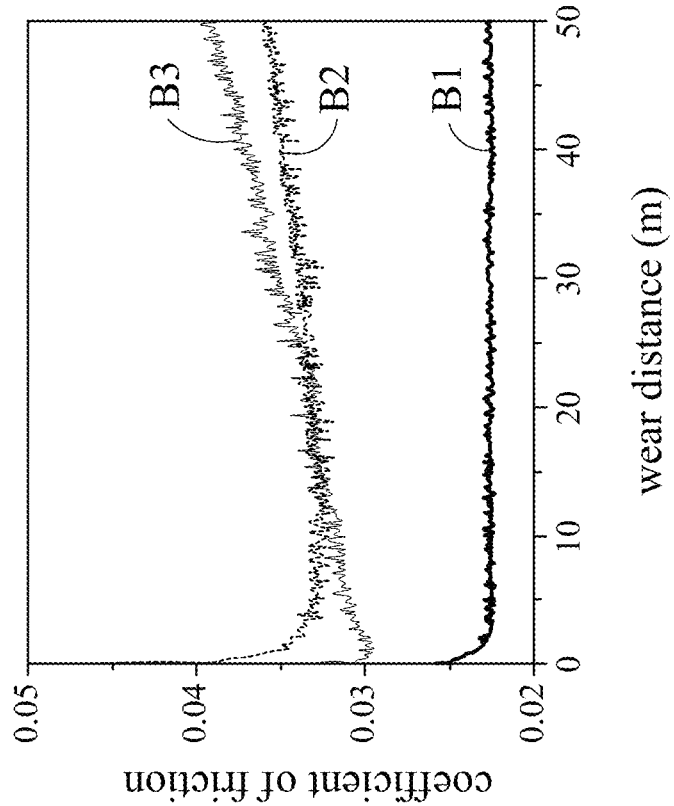
FIG. 7B shows a schematic view of a relation between coefficient of friction and the wear distance of the scaly triboelectric membrane according to the 1st embodiment in FIG. 1, the polylactic acid membrane according to the 1st comparison example and the nylon membrane according to the 2nd comparison example.
Figure 7A:
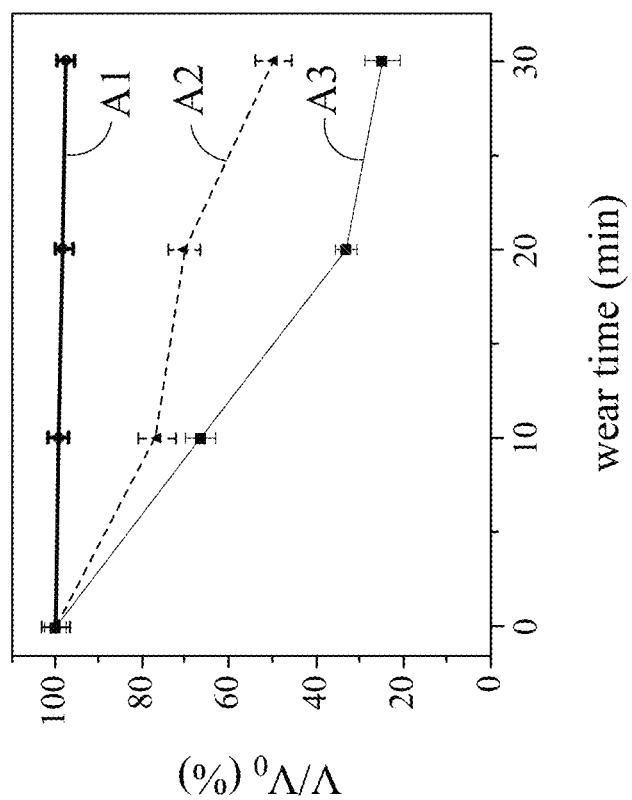
FIG. 7A shows a schematic view of a relation between voltage ratios and the wear time of the scaly triboelectric membrane according to the 1st embodiment in FIG. 1, the polylactic acid membrane according to the 1st comparison example and the nylon membrane according to the 2nd comparison example.

FIG. 4A shows a schematic view of the scaly triboelectric membrane 120 according to the 1st embodiment in FIG. 1 after wearing on a scanning electron microscope. FIG. 4B shows a schematic view of the relation between an output voltage and a wear time of the scaly triboelectric membrane 120 according to the 1st embodiment in FIG. 1 during frictional electrification. FIG. 5A shows a schematic view of a polylactic acid membrane according to the 1st comparison example after wearing on the scanning electron microscope. FIG. 5B shows a schematic view of the relation between an output voltage and a wear time of the polylactic acid membrane according to the 1st comparison example during frictional electrification. FIG. 6A shows a schematic view of a nylon membrane according to the 2nd comparison example after wearing on the scanning electron microscope. FIG. 6B shows a schematic view of the relation between an output voltage and a wear time of the nylon membrane according to the 2nd comparison example during frictional electrification. FIG. 7A shows a schematic view of a relation between voltage ratios $V/V_0$ and the wear time of the scaly triboelectric membrane 120 according to the 1st embodiment in FIG. 1, the polylactic acid membrane according to the 1st comparison example and the nylon membrane according to the 2nd comparison example. FIG. 7B shows a schematic view of a relation between coefficient of friction and the wear distance of the scaly triboelectric membrane 120 according to the 1st embodiment in FIG. 1, the polylactic acid membrane according to the 1st comparison example and the nylon membrane according to the 2nd comparison example. In the 1st embodiment, the surface potential of the scaly triboelectric membrane 120 at an initial moment of frictional electrification is 642 mV, a surface potential of the polylactic acid membrane according to the 1st comparison example at an initial moment of frictional electrification is 480 mV, a surface potential of the nylon membrane according to the 2nd comparison example at an initial moment of frictional electrification is 348 mV. As results, the scaly triboelectric membrane 120 is a frictional electrification material which is easier to be charged positively than the polylactic acid membrane according to the 1st comparison example and the nylon membrane according to the 2nd comparison example. As shown in FIGS. 4A to 6B, after wearing and charging the scaly triboelectric membrane 120 according to the 1st embodiment in FIG. 1, the polylactic acid membrane according to the 1st comparison example and the nylon membrane according to the 2nd comparison example for 30 minutes, on the scanning electron microscope, a surface wear of the scaly triboelectric membrane 120 is not obvious compared with the surface wear of the polylactic acid membrane according to the 1st comparison example and the nylon membrane according to the 2nd comparison example at wear time from 0 minute (0 min), 10 minutes (10 min), 20 minutes (20 min) to 30 minutes (30 min). As arrows pointing in FIGS. 5A and 6A, apparent wear traces appear in the polylactic acid membrane according to the 1st comparison example and the nylon membrane according to the 2nd comparison example after wearing. And, the output voltage of the scaly triboelectric membrane 120 after wearing for 30 minutes does not decline obviously compared with the output voltages of the polylactic acid membrane according to the 1st comparison example and the nylon membrane according to the 2nd comparison example. Moreover, as shown in FIG. 7A, lines A1, A2, A3 represent the voltage ratios $V/V_0$ of the scaly triboelectric membrane 120, the polylactic acid membrane according to the 1st comparison example and the nylon membrane according to the 2nd comparison example, respectively, and each of the voltage ratios $V/V_0$ is a ratio of the output voltage V and an initial output voltage $V_0$. As shown in FIG. 7B, lines B1, B2, B3 represent coefficients of friction of the scaly triboelectric membrane 120, the polylactic acid membrane according to the 1st comparison example and the nylon membrane according to the 2nd comparison example, respectively. Compared with the voltage ratios $V/V_0$ of the scaly triboelectric membrane 120, the polylactic acid membrane according to the 1st comparison example and the nylon membrane according to the 2nd comparison example, the voltage ratio $V/V_0$ of the scaly triboelectric membrane 120 declines the least, and the coefficient of friction of the scaly triboelectric membrane 120 hardly increases with increasing wear distance. As shown in FIGS. 4A to 7B, the scaly triboelectric membrane 120 is more wear resistant and can provide the more stable electric power than the conventional triboelectric membranes.

Figure 8C:
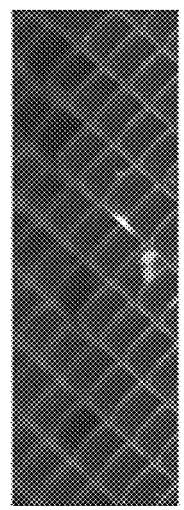
FIG. 8C shows a schematic view of a structure of a drop-shaped triboelectric membrane according to the 4th comparison example on a scanning electron microscope.
Figure 8B:
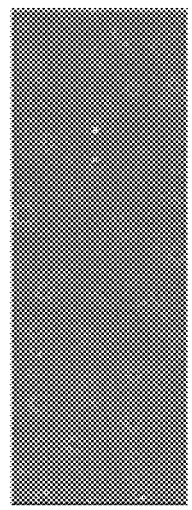
FIG. 8B shows a schematic view of a structure of a flat triboelectric membrane according to the 3rd comparison example on a scanning electron microscope.
Figure 8A:
FIG. 8A shows another schematic view of the structure of the scaly triboelectric membrane according to the 1st embodiment in FIG. 1 on a scanning electron microscope.
Figure 9C:
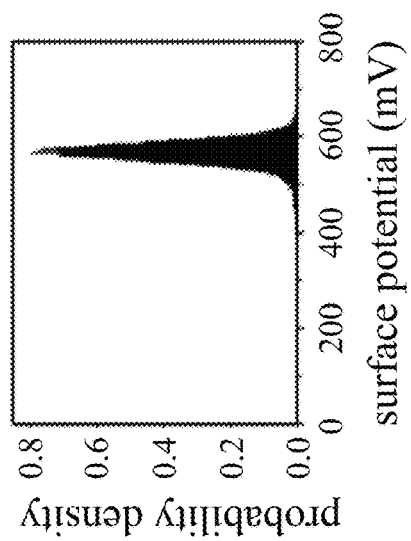
FIG. 9C shows a schematic view of a relation between the surface potential and a probability density of the drop-shaped triboelectric membrane according to the 4th comparison example in FIG. 8C at an initial moment of frictional electrification.
Figure 9B:
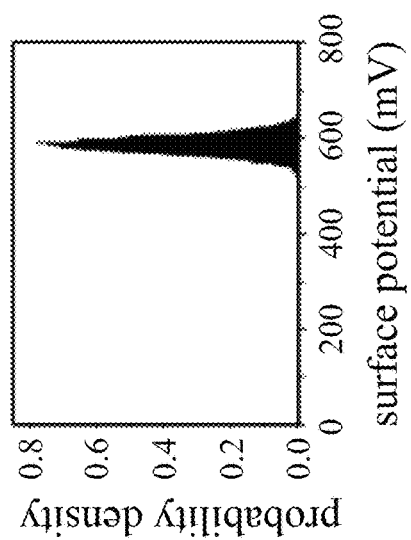
FIG. 9B shows a schematic view of a relation between the surface potential and a probability density of the flat triboelectric membrane according to the 3rd comparison example in FIG. 8B at an initial moment of frictional electrification.
Figure 9A:
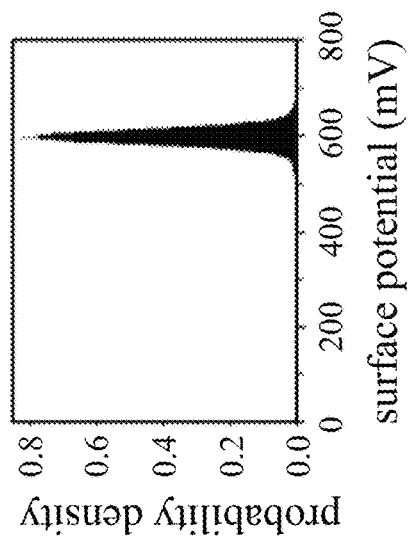
FIG. 9A shows a schematic view of a relation between the surface potential and a probability density of the scaly triboelectric membrane according to the 1st embodiment in FIG. 1 at the initial moment of frictional electrification.
Figure 10C:
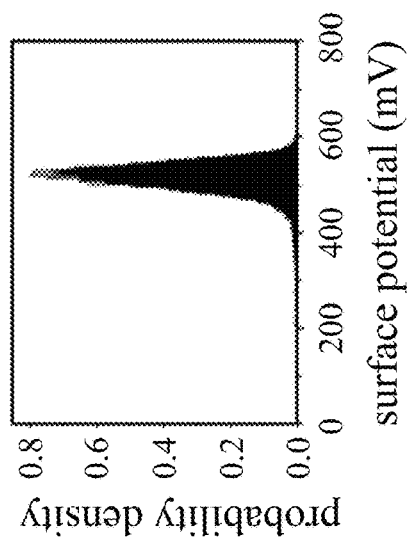
FIG. 10C shows a schematic view of a relation between the surface potential and a probability density of the drop-shaped triboelectric membrane according to the 4th comparison example in FIG. 8C during frictional electrification for 30 minutes.
Figure 10B:
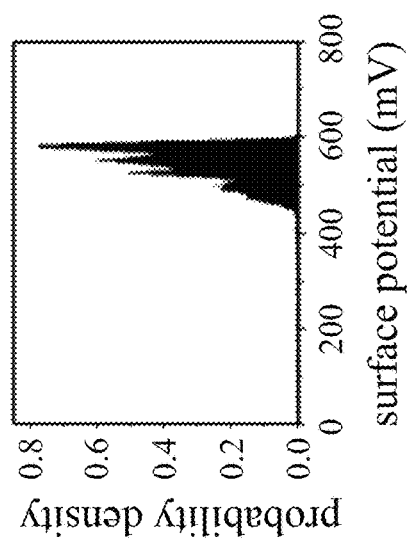
FIG. 10B shows a schematic view of a relation between the surface potential and a probability density of the flat triboelectric membrane according to the 3rd comparison example in FIG. 8B during frictional electrification for 30 minutes.
Figure 10A:
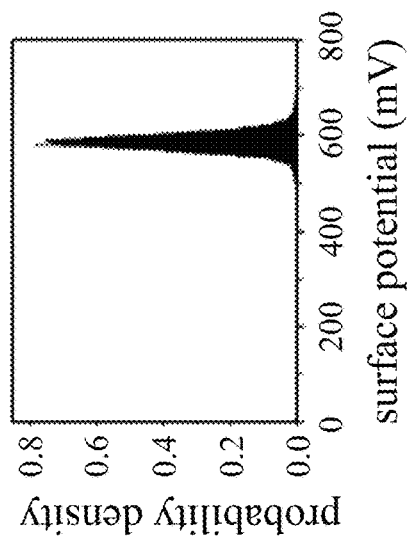
FIG. 10A shows a schematic view of a relation between the surface potential and a probability density of the scaly triboelectric membrane according to the 1st embodiment in FIG. 1 during frictional electrification for 30 minutes.
Figure 11:
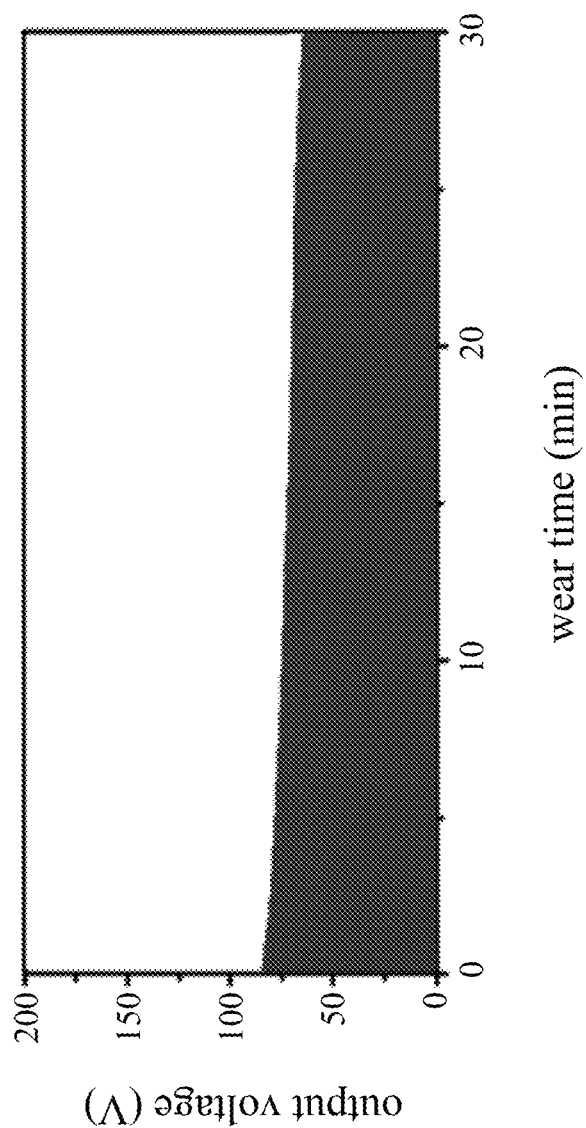
FIG. 11 shows a schematic view of the relation between an output voltage and a wear time of the flat triboelectric membrane according to the 3rd comparison example in FIG. 8B during frictional electrification.
Figure 12:
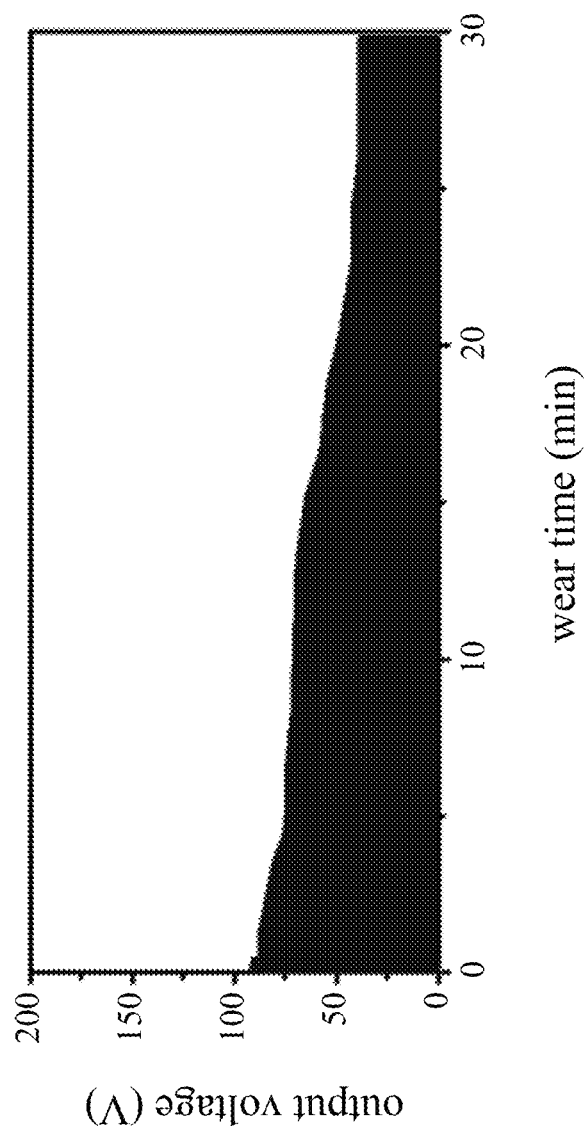
FIG. 12 shows a schematic view of the relation between an output voltage and a wear time of the drop-shaped triboelectric membrane according to the 4th comparison example in FIG. 8C during frictional electrification.
Figure 13A:
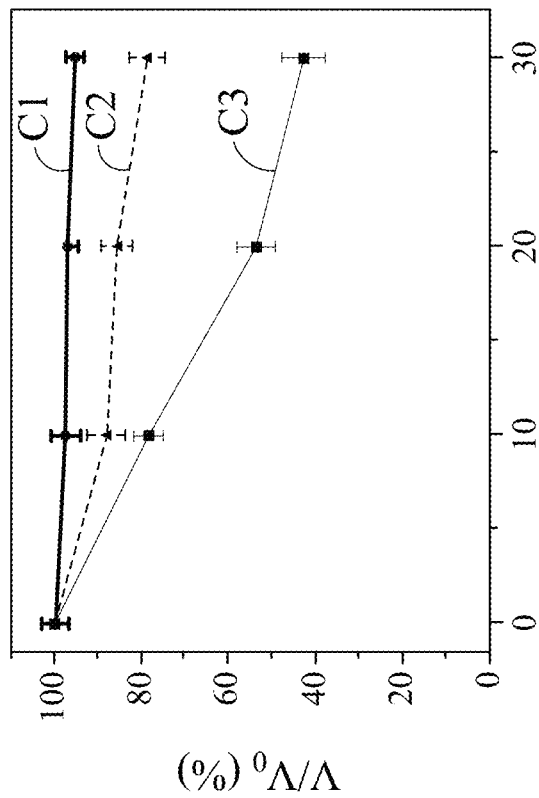
FIG. 13A shows a schematic view of a relation between voltage ratios and the wear time of the scaly triboelectric membrane according to the 1st embodiment in FIG. 1, the flat triboelectric membrane according to the 3rd comparison example in FIG. 8B and the drop-shaped triboelectric membrane during frictional electrification according to the 4th comparison example in FIG. 8C.
Figure 13B:
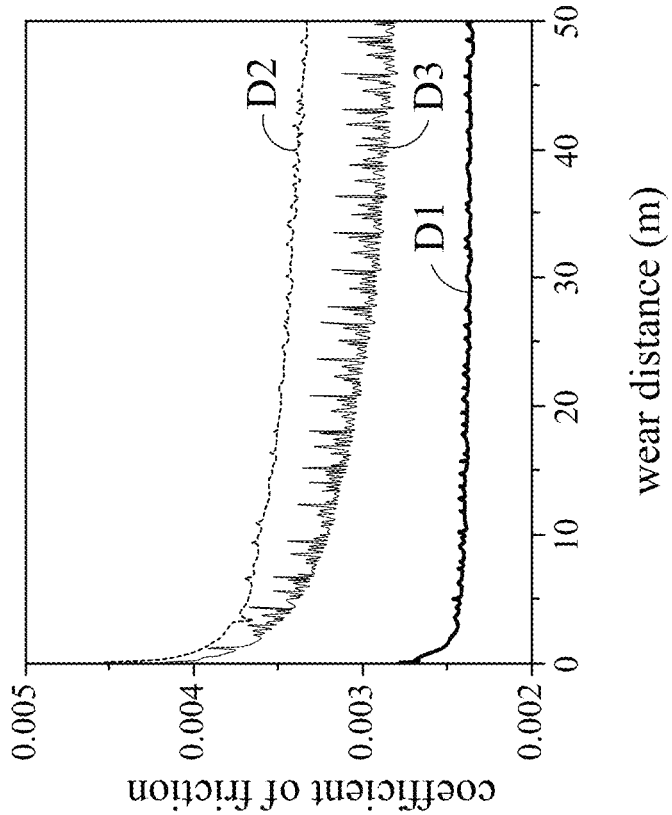
FIG. 13B shows a schematic view of a relation between coefficient of friction and the wear distance of the scaly triboelectric membrane according to the 1st embodiment in FIG. 1, the flat triboelectric membrane according to the 3rd comparison example in FIG. 8B and the drop-shaped triboelectric membrane during frictional electrification according to the 4th comparison example in FIG. 8C.

FIG. 8A shows another schematic view of the structure of the scaly triboelectric membrane 120 according to the 1st embodiment in FIG. 1 on a scanning electron microscope. FIG. 8B shows a schematic view of a structure of a flat triboelectric membrane according to the 3rd comparison example on a scanning electron microscope. FIG. 8C shows a schematic view of a structure of a drop-shaped triboelectric membrane according to the 4th comparison example on a scanning electron microscope. FIG. 9A shows a schematic view of a relation between the surface potential and a probability density of the scaly triboelectric membrane 120 according to the 1st embodiment in FIG. 1 at the initial moment of frictional electrification. FIG. 9B shows a schematic view of a relation between the surface potential and a probability density of the flat triboelectric membrane according to the 3rd comparison example in FIG. 8B at an initial moment of frictional electrification. FIG. 9C shows a schematic view of a relation between the surface potential and a probability density of the drop-shaped triboelectric membrane according to the 4th comparison example in FIG. 8C at an initial moment of frictional electrification. FIG. 10A shows a schematic view of a relation between the surface potential and a probability density of the scaly triboelectric membrane 120 according to the 1st embodiment in FIG. 1 during frictional electrification for 30 minutes. FIG. 10B shows a schematic view of a relation between the surface potential and a probability density of the flat triboelectric membrane according to the 3rd comparison example in FIG. 8B during frictional electrification for 30 minutes. FIG. 10C shows a schematic view of a relation between the surface potential and a probability density of the drop-shaped triboelectric membrane according to the 4th comparison example in FIG. 8C during frictional electrification for 30 minutes. FIG. 11 shows a schematic view of the relation between an output voltage and a wear time of the flat triboelectric membrane according to the 3rd comparison example in FIG. 8B during frictional electrification. FIG. 12 shows a schematic view of the relation between an output voltage and a wear time of the drop-shaped triboelectric membrane according to the 4th comparison example in FIG. 8C during frictional electrification. FIG. 13A shows a schematic view of a relation between voltage ratios $V/V_0$ and the wear time of the scaly triboelectric membrane 120 according to the 1st embodiment in FIG. 1, the flat triboelectric membrane according to the 3rd comparison example in FIG. 8B and the drop-shaped triboelectric membrane during frictional electrification according to the 4th comparison example in FIG. 8C. FIG. 13B shows a schematic view of a relation between coefficient of friction and the wear distance of the scaly triboelectric membrane 120 according to the 1st embodiment in FIG. 1, the flat triboelectric membrane according to the 3rd comparison example in FIG. 8B and the drop-shaped triboelectric membrane during frictional electrification according to the 4th comparison example in FIG. 8C. As shown in FIGS. 8B and 8C, the triboelectric membranes according to the 3rd and 4th comparison examples include the keratin and the polyvinyl alcohol as the same as the scaly triboelectric membrane 120 of the 1st embodiment. In detail, the triboelectric membranes according to the 3rd and 4th comparison examples are made of the same material as the scaly triboelectric membrane 120 of the 1st embodiment. Specially, the triboelectric membranes according to the 3rd comparison example in FIG. 8B and the 4th comparison example in FIG. 8C are the flat triboelectric membrane and the drop-shaped triboelectric membrane, respectively; that is, triboelectric surfaces of the flat triboelectric membrane according to the 3rd comparison example in FIG. 8B and the drop-shaped triboelectric membrane according to the 4th comparison example in FIG. 8C are flat and drop-shaped, respectively. As shown in FIGS. 9A to 10C, each of the flat triboelectric membrane according to the 3rd comparison example in FIG. 8B and the drop-shaped triboelectric membrane according to the 4th comparison example in FIG. 8C is disposed at the same structure of the triboelectric nanogenerating device 100 of the 1st embodiment, and each of the scaly triboelectric membrane 120, the flat triboelectric membrane and the drop-shaped triboelectric membrane rotates at the speed of 1000 rpm in 30 minutes for frictional electrification. The surface potential of the scaly triboelectric membrane 120, the flat triboelectric membrane according to the 3rd comparison example in FIG. 8B and the drop-shaped triboelectric membrane according to the 4th comparison example in FIG. 8C are decreased from 598 mV, 588 mV and 576 mV to 587 mV, 552 mV and 527 mV, respectively. Moreover, as shown in FIGS. 4B, 11 and 12, the output voltage of the scaly triboelectric membrane 120 declines the least compared with the output voltages of the flat triboelectric membrane according to the 3rd comparison example in FIG. 8B and the drop-shaped triboelectric membrane according to the 4th comparison example in FIG. 8C. As shown in FIGS. 13A and 13B, lines C1, C2, C3 represent the voltage ratios $V/V_0$ of the scaly triboelectric membrane 120, the flat triboelectric membrane according to the 3rd comparison example in FIG. 8B and the drop-shaped triboelectric membrane according to the 4th comparison example in FIG. 8C, and lines D1, D2, D3 represent the coefficients of friction of the scaly triboelectric membrane 120, the flat triboelectric membrane according to the 3rd comparison example in FIG. 8B and the drop-shaped triboelectric membrane according to the 4th comparison example in FIG. 8C. Specifically, decreasing percentages of the voltage ratios $V/V_0$ of the scaly triboelectric membrane 120, the flat triboelectric membrane according to the 3rd comparison example in FIG. 8B and the drop-shaped triboelectric membrane according to the 4th comparison example in FIG. 8C after wearing for 30 minutes are 5%, 23% and 60%, respectively, and the coefficient of friction of the scaly triboelectric membrane 120 is the least compared with the flat triboelectric membrane according to the 3rd comparison example in FIG. 8B and the drop-shaped triboelectric membrane according to the 4th comparison example in FIG. 8C. As shown in FIGS. 9A to 13B, compared with the triboelectric membrane with the same material but having different surface structures, the scaly triboelectric membrane 120 is more wear resistant and can provide the more stable electric power.

Figure 14:
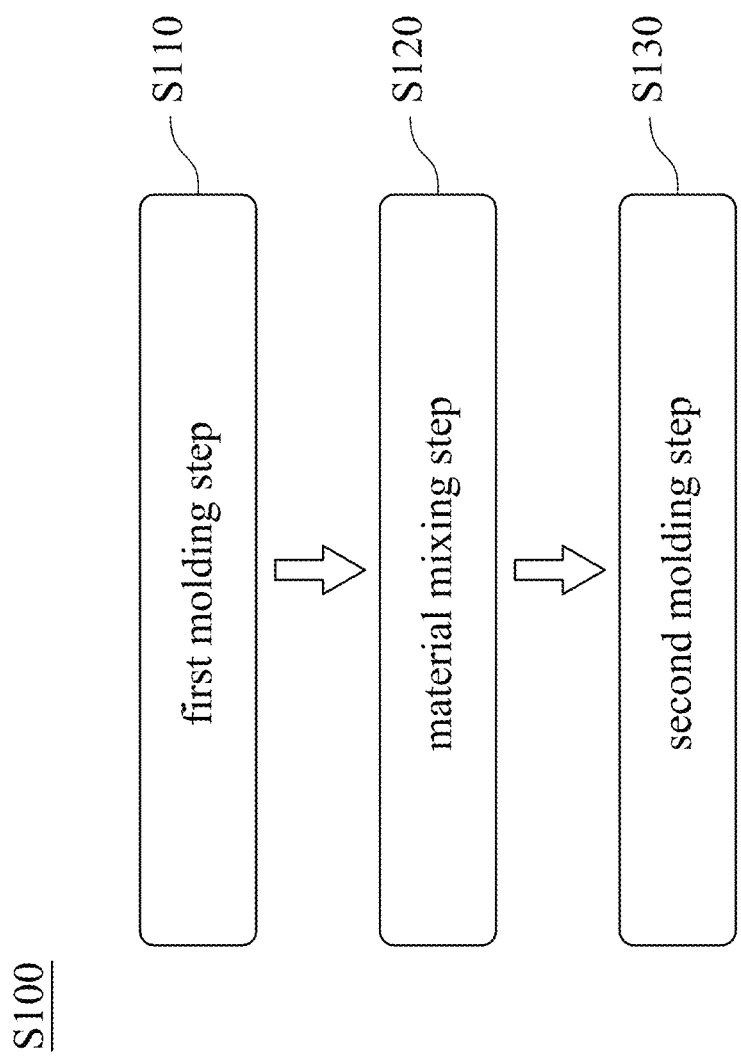
FIG. 14 shows a block flow diagram of a scaly triboelectric membrane fabricating method according to the 2nd embodiment of the present disclosure.
Figure 15C:
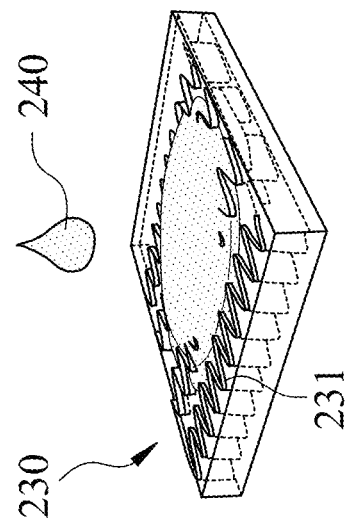
FIG. 15C shows a schematic view of a liquid poured into the second template in the scaly triboelectric membrane fabricating method according to the 2nd embodiment in FIG. 14.
Figure 15B:
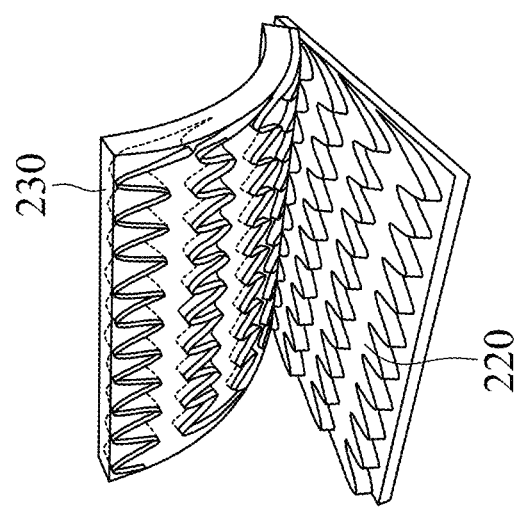
FIG. 15B shows a schematic view of a second template removed from the first template in the scaly triboelectric membrane fabricating method according to the 2nd embodiment in FIG. 14.
Figure 15A:
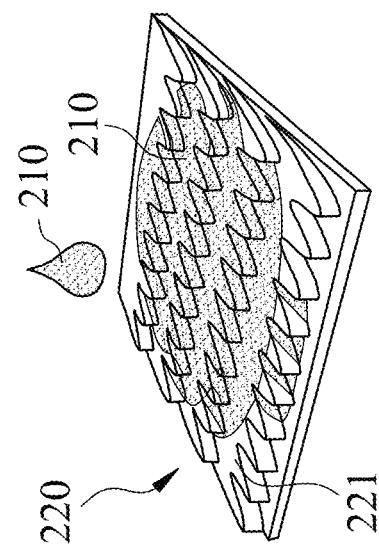
FIG. 15A shows a schematic view of a molding liquid poured into a first template in the scaly triboelectric membrane fabricating method according to the 2nd embodiment in FIG. 14.
Figure 16B:
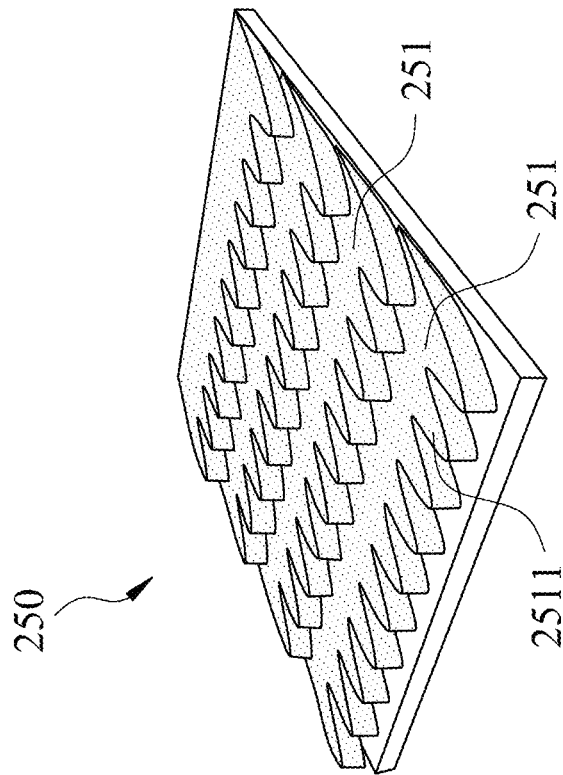
FIG. 16B shows a schematic view of the scaly triboelectric membrane fabricated by the scaly triboelectric membrane fabricating method according to the 2nd embodiment in FIG. 14.
Figure 16A:
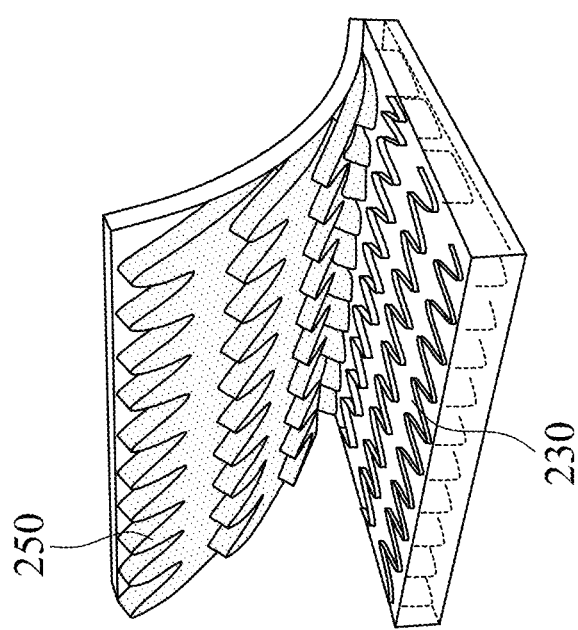
FIG. 16A shows a schematic view of a scaly triboelectric membrane removed from the second template in the scaly triboelectric membrane fabricating method according to the 2nd embodiment in FIG. 14.

FIG. 14 shows a block flow diagram of a scaly triboelectric membrane fabricating method S100 according to the 2nd embodiment of the present disclosure. FIG. 15A shows a schematic view of a molding liquid 210 poured into a first template 220 in the scaly triboelectric membrane fabricating method S100 according to the 2nd embodiment in FIG. 14. FIG. 15B shows a schematic view of a second template 230 removed from the first template 220 in the scaly triboelectric membrane fabricating method S100 according to the 2nd embodiment in FIG. 14. FIG. 15C shows a schematic view of a liquid 240 poured into the second template 230 in the scaly triboelectric membrane fabricating method S100 according to the 2nd embodiment in FIG. 14. FIG. 16A shows a schematic view of a scaly triboelectric membrane 250 removed from the second template 230 in the scaly triboelectric membrane fabricating method S100 according to the 2nd embodiment in FIG. 14. FIG. 16B shows a schematic view of the scaly triboelectric membrane 250 fabricated by the scaly triboelectric membrane fabricating method S100 according to the 2nd embodiment in FIG. 14. The scaly triboelectric membrane fabricating method S100 is configured for fabricating the scaly triboelectric membrane 250 of a triboelectric nanogenerating device and the scaly triboelectric membrane fabricating method S100 includes a first molding step S110, a material mixing step S120 and a second molding step S130. The first molding step S110 is performed to pour the molding liquid 210 into a first surface 221 of the first template 220, to heat and cure the molding liquid 210 to form the second template 230, and then to remove the second template 230 from the first template 220. A material of the molding liquid 210 is polydimethylsiloxane, and a material of the first template 220 is a snake scale. The material mixing step S120 is performed to mix a keratin with a polyvinyl alcohol to form the liquid 240. The second molding step S130 is performed to pour the liquid 240 into a second surface 231 of the second template 230 corresponding to the first surface 221 of the first template 220, and then to remove the scaly triboelectric membrane 250 formed by curing the liquid 240 from the second template 230. The structures of scaly layers 251 and saw-tooth structures 2511 of the scaly triboelectric membrane 250 are the same as the scaly layers 1211 and the saw-tooth structures 1212 of the 1st embodiment, and it will not be described here again.

By molding twice, the surface of the scaly triboelectric membrane 250 can mimic the surface structure of the snake scale successfully, and the scaly triboelectric membrane 250 can be made of the material similar to the snake scale so the scaly triboelectric membrane 250 is effectively wear resistant when being applied to a triboelectric nanogenerating device and providing the electric power to an electronic device stably.

Figure 17:
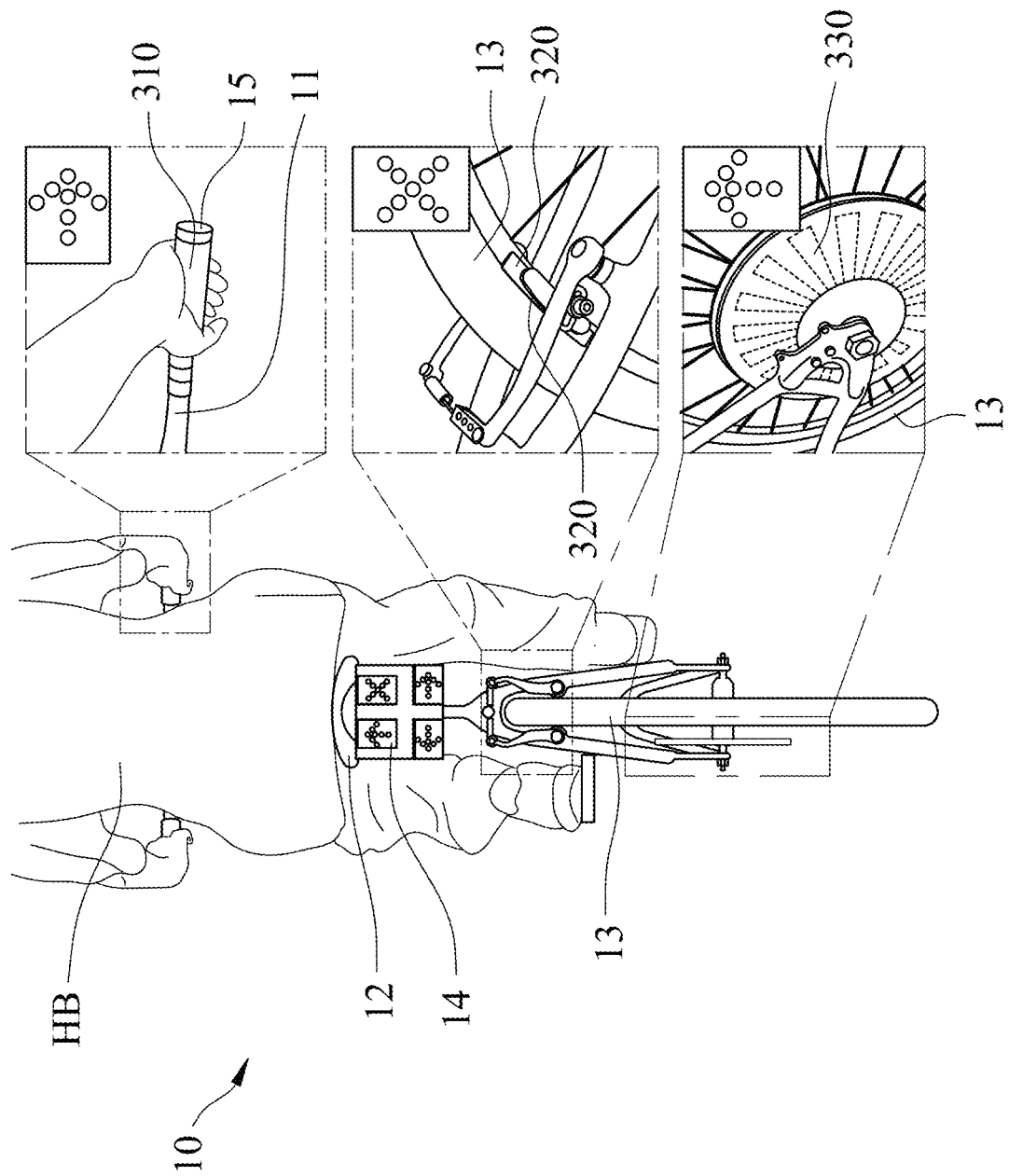
FIG. 17 shows a schematic view of a bicycle according to the 3rd embodiment of the present disclosure and a user.
Figure 18:
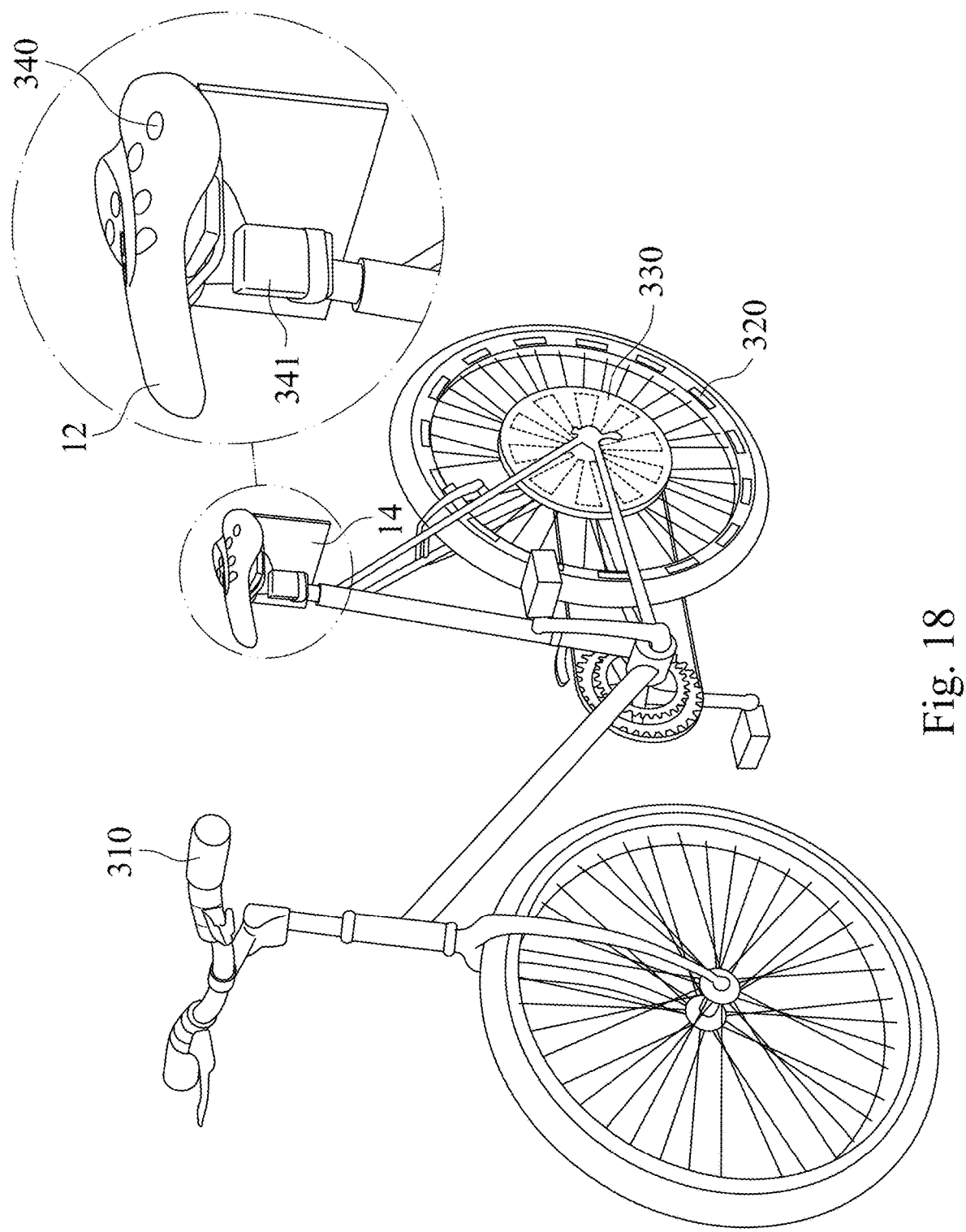
FIG. 18 shows a schematic view of the bicycle according to the 3rd embodiment in FIG. 17.

FIG. 17 shows a schematic view of a bicycle 10 according to the 3rd embodiment of the present disclosure and a user HB. FIG. 18 shows a schematic view of the bicycle 10 according to the 3rd embodiment in FIG. 17. As shown in FIGS. 17 and 18, the bicycle 10 includes a bicycle frame 11, two wheels 13, a plurality of electronic devices 14, 341 and a plurality of triboelectric nanogenerating devices 310, 320, 330, 340. The bicycle frame 11 includes a seat saddle 12 and two handlebars 15. The two wheels 13 are connected to the bicycle frame 11. The electronic devices 14, 341 are disposed at the bicycle frame 11, and the electronic device 14 is an instructing light device and disposed at the rear of the seat saddle 12. Each of the triboelectric nanogenerating devices 310, 320, 330 is configured for providing the electric power to the electronic device 14 and includes at least one scaly triboelectric membrane. In the 3rd embodiment, the structure of the scaly triboelectric membrane can be the same as the scaly triboelectric membrane 120, and it will not be described here again.

Specifically, a number of the electronic device 14 is plural, the triboelectric nanogenerating devices 310 is a SE mode triboelectric nanogenerating device, and the triboelectric nanogenerating devices 310 are disposed on the two handlebars 15. Two of the electronic devices 14 are electrically connected to the triboelectric nanogenerating devices 310 disposed on the two handlebars 15 on a left-hand side and a right-hand side, respectively. Because a skin of a human body and the triboelectric nanogenerating devices 310 are classified as different triboelectric materials, when the user HB of the bicycle 10 pats one of the triboelectric nanogenerating devices 310 on the two handlebars 15 by a right or left hand, the electric charges are transferred from the right or left hand to the triboelectric nanogenerating device 310 by contacting; then, the electric power is provided to the electronic devices 14 such that the electronic devices 14 disposed at the rear of the seat saddle 12 can display a signal of turning left or turning right to warn road users behind.

The triboelectric nanogenerating device 320 is a vertical CS mode triboelectric nanogenerating device, and the triboelectric nanogenerating device 320 is disposed at a brake of the bicycle 10. When the user HB of the bicycle 10 hits the brake of the bicycle 10 by the brake contacting the wheel 13, the triboelectric nanogenerating device 320 contacts the wheel 13, and then provides the electric power to one of the electronic devices 14 by frictional electrification such that the electronic devices 14 can display a stopping signal to warn the road users behind.

The triboelectric nanogenerating device 330 can be a LS mode triboelectric nanogenerating device. In detail, the triboelectric nanogenerating device 330 is a rotary-sliding triboelectric nanogenerating device. When the user HB of the bicycle 10 steps on pedals to spin the wheels 13, the triboelectric nanogenerating device 330 rotates and provides the electric power to one of the electronic devices 14 continuously by frictional electrification such that the electronic devices 14 can display continuously a forward signal to warn the road users behind.

Figure 19:
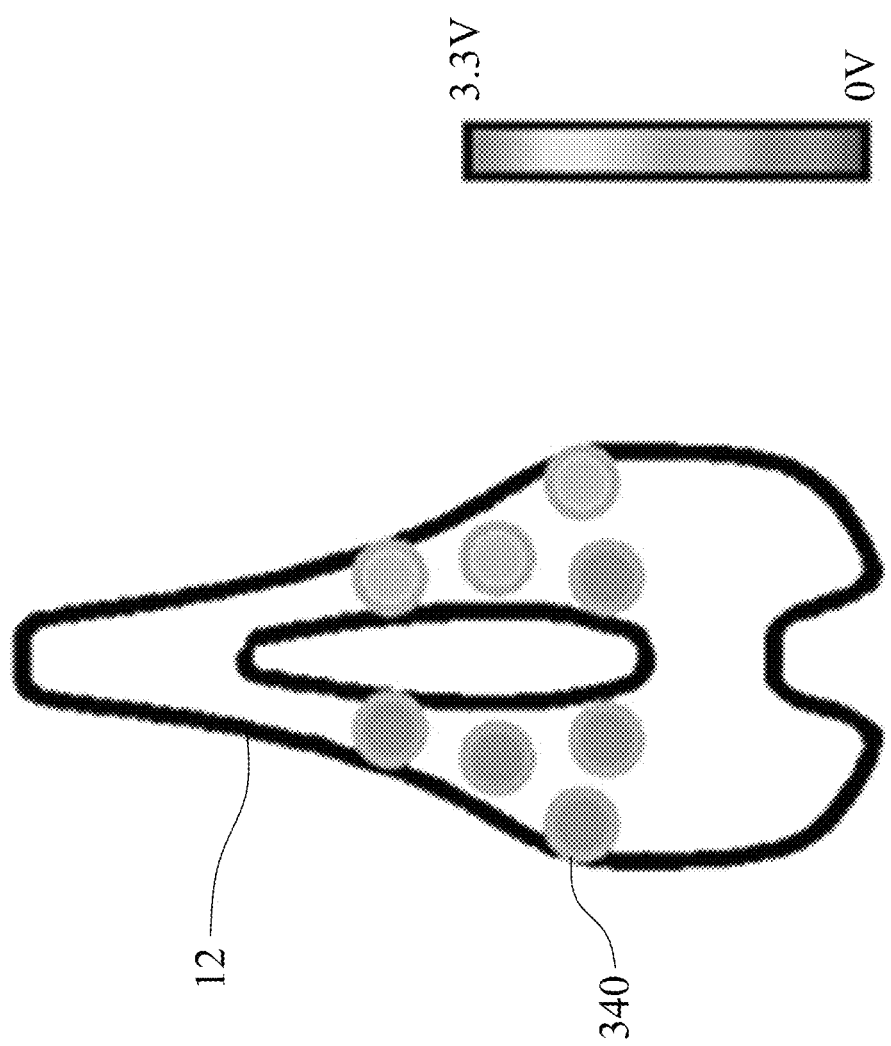
FIG. 19 shows a schematic view of voltage measuring of the triboelectric nanogenerating devices disposed on the seat saddle according to the 3rd embodiment in FIG. 18.
Figure 20:
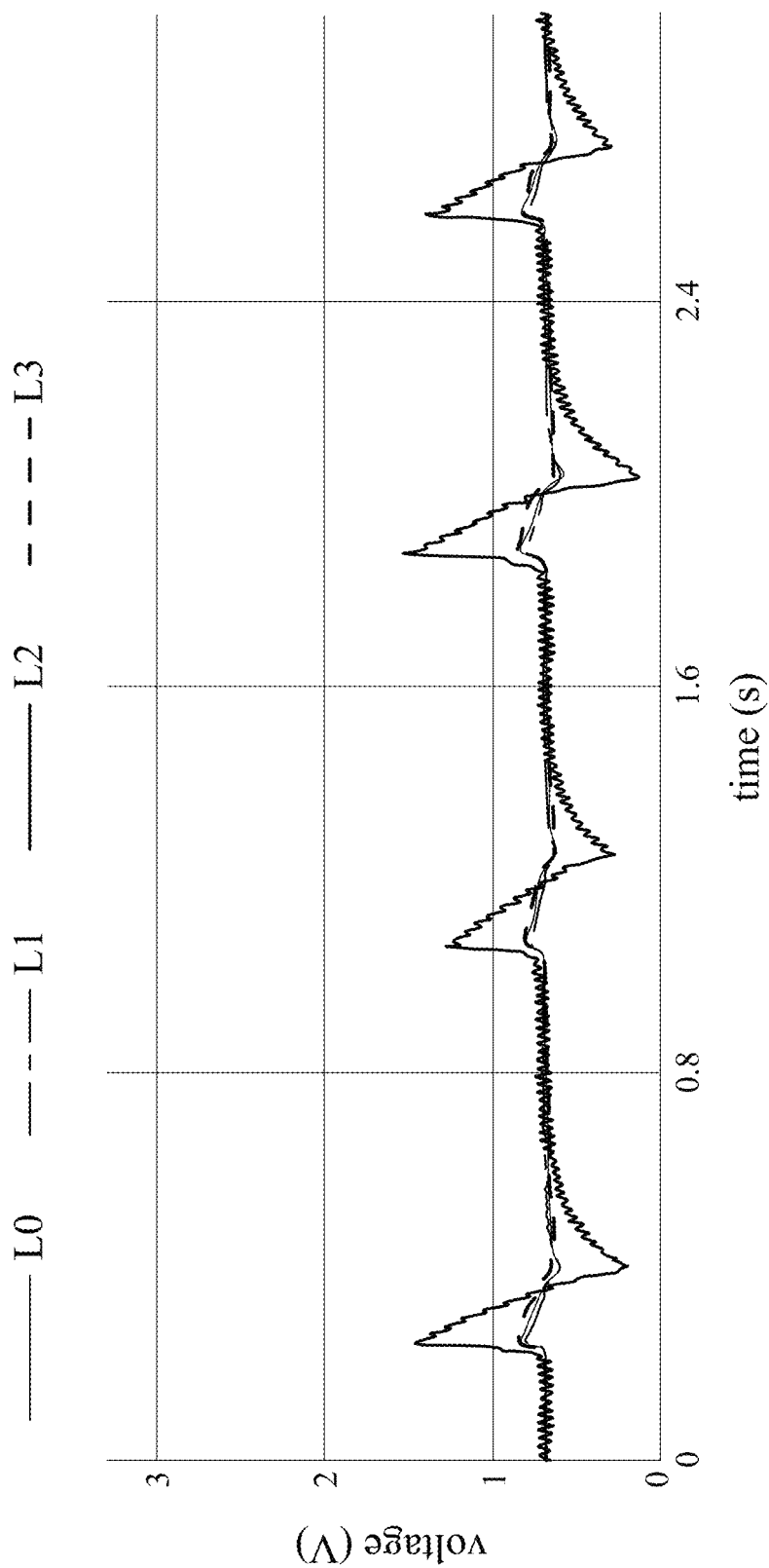
FIG. 20 shows a schematic view of a relation between a voltage and a time of the triboelectric nanogenerating devices on a left side of the seat saddle according to the 3rd embodiment in FIG. 18.
Figure 21:
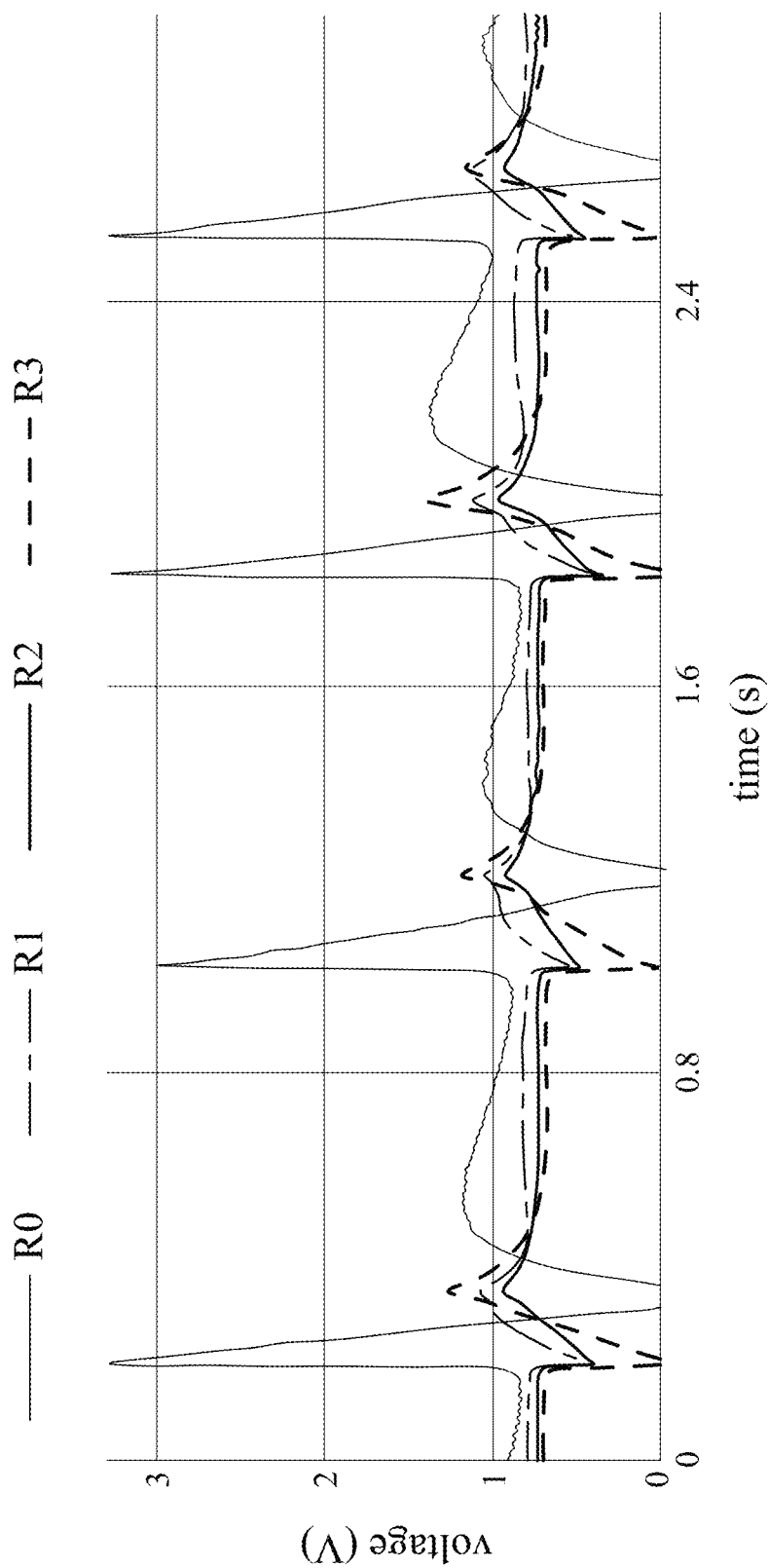
FIG. 21 shows a schematic view of a relation between a voltage and a time of the triboelectric nanogenerating devices on a right side of the seat saddle according to the 3rd embodiment in FIG. 18.

FIG. 19 shows a schematic view of voltage measuring of the triboelectric nanogenerating devices 340 disposed on the seat saddle 12 according to the 3rd embodiment in FIG. 18. FIG. 20 shows a schematic view of a relation between a voltage and a time of the triboelectric nanogenerating devices 340 on a left side of the seat saddle 12 according to the 3rd embodiment in FIG. 18. FIG. 21 shows a schematic view of a relation between a voltage and a time of the triboelectric nanogenerating devices 340 on a right side of the seat saddle 12 according to the 3rd embodiment in FIG. 18. As shown FIG. 18, the electronic device 341 is a wireless transmitting device electrically connected to the triboelectric nanogenerating devices 340. Specifically, each of the triboelectric nanogenerating devices 340 is a SE mode triboelectric nanogenerating device, a number of the triboelectric nanogenerating devices 340 is eight, but the present disclosure is not limited thereto. As shown in FIG. 19, the eight triboelectric nanogenerating devices 340 are disposed on a surface of the seat saddle 12. Furthermore, four of the triboelectric nanogenerating devices 340 are disposed on a left-side surface of the seat saddle 12, and the other four of the triboelectric nanogenerating devices 340 are disposed on a right-side surface of the seat saddle 12. When the user HB sits on the seat saddle 12, the weight shifting of the user HB can cause difference of a potential of the triboelectric nanogenerating devices 340 at different positions; thus, the triboelectric nanogenerating devices 340 can be used as a pressure sensor and configured for detecting the weight shifting of the user HB on the seat saddle 12. In detail, in FIG. 19, a voltage difference detected by the triboelectric nanogenerating devices 340 is a voltage difference measured at a certain point in time when the user HB uses the bicycle 10. As shown in FIG. 19, the voltage detected by three of the triboelectric nanogenerating devices 340 located at the right-side surface of the seat saddle 12 is higher than the voltage detected by the other of the triboelectric nanogenerating devices 340, and it represents that the weight shifting of the user HB during measuring tends to be right. As shown in FIGS. 20 and 21, when the user HB uses the bicycle 10, the voltage measured by the triboelectric nanogenerating devices 340 changes with the change of the weight shifting of the user HB. In detail, lines L0, L1, L2, L3 represent the voltages of the triboelectric nanogenerating devices 340 disposed on the left-side surface of the seat saddle 12, and lines R0, R1, R2, R3 represent the voltages of the triboelectric nanogenerating devices 340 disposed on the right-side surface of the seat saddle 12. As shown in FIGS. 20 and 21, the triboelectric nanogenerating devices 340 can detect the weight shifting of the user HB by detecting the voltage changing with time. By disposing the pressure sensors at different positions on the seat saddle 12, a dataset of weight shifting of the user HB can be transmitted to a remote device by the electronic device 341. In detail, the remote device can be a cell phone or a tablet of the user HB, but the present disclosure is not limited thereto. When the weight shifting of the user HB is beyond a predetermined threshold, the remote device can send an alert to warn the user HB or the road users to prevent an accident of turning turtle of the bicycle 10.

Furthermore, the present disclosure provides the self-powered bicycle 10 based on biomechanics, which mainly includes a traffic warning system and multi-point pressure sensing system. The traffic warning system includes three sub systems: a forward instructing sub system, a braking warning sub system and turning warning sub system. First, the forward instructing sub system is a LS mode element (that is, the triboelectric nanogenerating device 330) installed on wheel frames of the wheels 13 of the bicycle 10, and the forward instructing sub system lights a forward instructing light by stepping the pedals to spin the wheel 13 continuously. Second, the braking warning sub system is a brake pad on a brake caliper and a vertical CS mode element (that is, the triboelectric nanogenerating device 320), and the braking warning sub system light a braking warning light by pressing a brake bar on the handlebars 15 for slowing down or stopping to function of warning the vehicles behind. Last, major devices of the turning warning sub system, which belong to SE mode elements (that is, the triboelectric nanogenerating devices 310), are located at the right-hand and left-hand handlebars 15, and the turning warning sub system light a turning warning light by padding a right-hand or a left-hand handlebar when the user HB tends to move right or left, or to turn right or left to warn the moving direction of the bicycle 10 to the drivers behind. To optimize the experience of biking, in the present disclosure, the multi-point pressure sensing system is configured on the seat saddle 12 and combined with TENG sensors (that is, the triboelectric nanogenerating devices 340) and a Bluetooth wireless measuring module (that is, the electronic device 341). The multi-point pressure sensing system can transmit a pressure signal with multiple channels to one mobile device, and the mobile device can display in real time by a corresponding application to break the restriction of the conventional measuring system in space and detect the pressure difference of the uses HB on the seat saddle 12 in real time.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A triboelectric nanogenerating device, configured for providing an electric power to an electronic device, the triboelectric nanogenerating device comprising:
at least one scaly triboelectric membrane configured for providing the electric power to the electronic device by frictional electrification, wherein the at least one scaly triboelectric membrane comprises a keratin and a polyvinyl alcohol, the at least one scaly triboelectric membrane has a first triboelectric surface, and the first triboelectric surface of the at least one scaly triboelectric membrane comprises:
a plurality of scaly layers, each of the scaly layers arranged in order and extending along an orienting direction, wherein a distal end of each of the scaly layers has a plurality of saw-tooth structures.

2. The triboelectric nanogenerating device of claim 1, further comprising:
at least one electrode triboelectric membrane facing towards the first triboelectric surface of the at least one scaly triboelectric membrane and having a second triboelectric surface and a downward surface, wherein the second triboelectric surface of the at least one electrode triboelectric membrane is configured for rubbing against the first triboelectric surface of the at least one scaly triboelectric membrane; and
a sensing electrode layer disposed at the downward surface, wherein the sensing electrode layer transmits the electric power to the electronic device when the at least one scaly triboelectric membrane and the at least one electrode triboelectric membrane rub against and charge triboelectrically with each other.

3. The triboelectric nanogenerating device of claim 1, wherein a weight percentage of the keratin is ranged from 20% to 50%, a weight percentage of the polyvinyl alcohol is ranged from 50% to 80%, and the keratin is mixed with the polyvinyl alcohol to form the at least one scaly triboelectric membrane.

4. The triboelectric nanogenerating device of claim 2, wherein a material of the at least one electrode triboelectric membrane is polytetrafluoroethylene.

5. The triboelectric nanogenerating device of claim 1, wherein the keratin comprises a beta-sheet crystal structure.

6. The triboelectric nanogenerating device of claim 1, wherein a linear density of the scaly layers along the orienting direction is ranged from 0.25 $\mu m^{-1}$ to 0.35 $\mu m^{-1}$.

7. The triboelectric nanogenerating device of claim 1, wherein a linear density of the saw-tooth structures of each of the scaly layers along a tangential direction is ranged from 0.95 $\mu m^{-1}$ to 1.05 $\mu m^{-1}$.

8. A scaly triboelectric membrane fabricating method, configured for fabricating a scaly triboelectric membrane of a triboelectric nanogenerating device, the scaly triboelectric membrane fabricating method comprising:
a first molding step performed to pour a molding liquid into a first surface of a first template, to heat and cure the molding liquid to form a second template, and then to remove the second template from the first template, wherein a material of the molding liquid is polydimethylsiloxane, and a material of the first template is a snake scale;
a material mixing step performed to mix a keratin with a polyvinyl alcohol to form a liquid; and
a second molding step performed to pour the liquid into a second surface of the second template corresponding to the first surface of the first template, and then to remove the scaly triboelectric membrane formed by curing the liquid from the second template, wherein the scaly triboelectric membrane has a first triboelectric surface, the first triboelectric surface comprises a plurality of scaly layers, each of the scaly layers is arranged in order and extends along an orienting direction, and a distal end of each of the scaly layers has a plurality of saw-tooth structures.

9. The scaly triboelectric membrane fabricating method of claim 8, wherein a weight percentage of the keratin is ranged from 20% to 50%, a weight percentage of the polyvinyl alcohol is ranged from 50% to 80%, and the keratin is mixed with the polyvinyl alcohol to form the at least one scaly triboelectric membrane.

10. The scaly triboelectric membrane fabricating method of claim 8, wherein the keratin comprises a beta-sheet crystal structure.

11. A bicycle, comprising:
a bicycle frame comprising a seat saddle;
two wheels connected to the bicycle frame;
at least one electronic device disposed at the bicycle frame; and
at least one triboelectric nanogenerating device configured for providing an electric power to the at least one electronic device, and the at least one triboelectric nanogenerating device comprising:
at least one scaly triboelectric membrane configured for providing the electric power to the at least one electronic device by frictional electrification, wherein the at least one scaly triboelectric membrane comprises a keratin and a polyvinyl alcohol, the at least one scaly triboelectric membrane has a first triboelectric surface, and the first triboelectric surface of the at least one scaly triboelectric membrane comprises:
a plurality of scaly layers, each of the scaly layers arranged in order and extending along an orienting direction, wherein a distal end of each of the scaly layers has a plurality of saw-tooth structures.

12. The bicycle of claim 11, wherein the at least one triboelectric nanogenerating device further comprises:
at least one electrode triboelectric membrane facing towards the first triboelectric surface of the at least one scaly triboelectric membrane and having a second triboelectric surface and a downward surface, wherein the second triboelectric surface of the at least one electrode triboelectric membrane is configured for rubbing against the first triboelectric surface of the at least one scaly triboelectric membrane; and
a sensing electrode layer disposed at the downward surface, wherein the sensing electrode layer transmits the electric power to the electronic device when the at least one scaly triboelectric membrane and the at least one electrode triboelectric membrane rub against and charge triboelectrically with each other.

13. The bicycle of claim 11, wherein the at least one electronic device is a wireless transmitting device, a number of the at least one triboelectric nanogenerating device is plural, the triboelectric nanogenerating devices are disposed on a surface of the seat saddle, the wireless transmitting device is electrically connected to the triboelectric nanogenerating devices.

14. The bicycle of claim 11, wherein the bicycle frame further comprises two handlebars, a number of the at least one triboelectric nanogenerating device is plural, the triboelectric nanogenerating devices are disposed on the two handlebars, and each of the triboelectric nanogenerating devices is a single-electrode triboelectric nanogenerator.

15. The bicycle of claim 11, wherein a number of the at least one triboelectric nanogenerating device is plural, the triboelectric nanogenerating devices are disposed at the two wheels, and each of the triboelectric nanogenerating devices is a rotary-sliding triboelectric nanogenerator.

\* \* \* \* \*